United States Patent
Simonsson et al.

(10) Patent No.: US 8,270,976 B2
(45) Date of Patent: Sep. 18, 2012

(54) METHOD AND A USER EQUIPMENT IN A TELECOMMUNICATIONS SYSTEM

(75) Inventors: Arne Simonsson, Gammelstad (SE); András Rácz, Budapest (HU); Janne Peisa, Espoo (FI); Joakim Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 12/665,146

(22) PCT Filed: Jun. 12, 2008

(86) PCT No.: PCT/SE2008/050708
§ 371 (c)(1),
(2), (4) Date: Dec. 17, 2009

(87) PCT Pub. No.: WO2008/156417
PCT Pub. Date: Dec. 24, 2008

(65) Prior Publication Data
US 2010/0177721 A1    Jul. 15, 2010

(30) Foreign Application Priority Data

Jun. 21, 2007 (SE) .................................. 0701541

(51) Int. Cl.
*H04W 36/00* (2009.01)

(52) U.S. Cl. ............ 455/436; 455/450; 455/452.1; 455/423; 455/424; 455/425; 370/329; 370/332

(58) Field of Classification Search ............ 455/450, 455/452.1, 452.2, 453, 500, 423, 424, 425, 455/454; 370/329, 332, 395.42
See application file for complete search history.

(56) References Cited

U.S. PATENT DOCUMENTS

| | | | |
|---|---|---|---|
| 2002/0068579 A1* | 6/2002 | Ishikawa et al. | 455/453 |
| 2003/0169746 A1* | 9/2003 | Kitazawa et al. | 370/395.42 |
| 2007/0042784 A1* | 2/2007 | Anderson | 455/450 |
| 2009/0291692 A1* | 11/2009 | Kazmi et al. | 455/452.2 |

* cited by examiner

*Primary Examiner* — Kathy Wang-Hurst

(57) ABSTRACT

The present invention relates to a method for use in a user equipment (10), and relates to a user equipment (10) for enabling a serving base station (40) to estimate interference contribution in a network when scheduling resources for the use equipment. According to the method, the user equipment determines an amount of resources required to send data and the user equipment sends a report to it serving base station when the required amount of resources is greater than a threshold value. In the report, measurements performed by the user equipment are included. The report will assist the serving base station with its estimation of the degree of interference user equipments generates in the network, and hence the power and resources to assign.

17 Claims, 3 Drawing Sheets

METHOD AND A USER EQUIPMENT IN A TELECOMMUNICATIONS SYSTEM

TECHNICAL FIELD

The present invention relates generally to the field of mobile communications, and, more particularly to a method and a user equipment in a mobile communications system for supporting Inter-Cell Interference Coordination (ICI) for e.g. Long-term Evolution (LTE) as currently standardized by the third generation partnership project (3GPP).

BACKGROUND

In networks such as 3GPP LTE and/or universal mobile telecommunications system (UMTS) networks, mobile or wireless user equipment (UE:s) in a cell generally interfere with UE:s in other cells, especially when the same set of radio resources are used in the different cells across the network. This is known as inter-cell interference. Inter-Cell Interference Coordination (ICIC) is a method used to reduce the effect of inter-cell interference. The basic idea of ICIC is to prevent neighbouring UE:s, i.e. UE:s that are in different cells but are close to the particular base station, from using the same radio resources. ICIC can be seen as a scheduling approach, taking into consideration the situation in neighbouring cells. In order to support efficient ICIC, UE measurement and reporting scheme is needed since the radio positions of the UE:s have a significant impact on how much interference is contributed with to the neighbouring cells in the uplink. In addition, inter-cell interference is also increased when a UE is near the cell boarder, i.e. far from it serving base station (also known as NodeB or evolved NodeB (eNB)) but close to the neighbouring cell. This is because such a UE is power controlled, meaning that it will need to transmit with higher power than a UE close to the serving eNB. Suitable UE measurements that can be used for ICIC are handover path loss measurements as these are widely accepted to be useful for a variety of ICIC schemes. An example of such ICIC scheme in LTE for uplink is known as the overload indicator (OI). A working assumption for uplink inter-cell power control is that neighbouring eNBs can control individual UE:s served by that eNB through its scheduler based on the OI and available knowledge, e.g. path loss measurements obtained from ordinary/normal handover measurements and reporting. Thus, path loss measurements used for handover can be used for ICIC when scheduling resources for a UE.

Handover reporting, however, has different objectives so that additional reporting criteria for the ICIC are needed. The handover reports are expected to be threshold triggered. This thresholds will not be the same as for ICIC. As an example, handover typically has a threshold at e.g. 1-3 dB stronger neighbour, whereas for ICIC, a threshold of e.g. 6-20 dB weaker neighbour cell than the connected cell can be used. Furthermore, handover reporting can be triggered at one defined threshold, but for ICIC a more continuous measure covering a range of path losses and path loss differences is usually needed.

In e.g. the technical specification issued by 3GPP denoted TS 25.321 v.7.4.0 and entitled: "*Medium Access Control (MAC) protocol specification (Release 7)*", it is stated that the serving and neighbour cell path loss (SNPL) may be used by the NodeB of the serving cell to assist with its estimation of the degree of inter-cell interference each UE will generate and hence the absolute grant power and physical resources to assign/schedule.

A drawback with the solution described above is that the SNPL is always sent together with buffer status. The amount of resources to assign depends on the service and user interaction whereas the SNPL measurements change based on mobility of the UE. This can result in frequently SNPL reporting and a large overhead. It can also result in missing SNPL information due to that header reporting is configured to be sparse.

In U.S. patent application No. 60/895,580 it is described a solution on how to reduce interference in a network. In this prior art, the solution is to tie the uplink (UL) scheduling request and handover measurements to each other. Hence, the UE simultaneously as transmitting the UL scheduling request also transmits serving cell and neighbouring cell measurement information. The NodeB serving the UE can then make a decision and order the UE to perform a handover prior to sending data and thereby moving the UE into the new cell (with respect to signal strength) prior to sending the data. The NodeB takes the handover decision before the UE has triggered the handover. This way a faster HO decision is taken thus leading in reduction in the amount of interference the UE generates in the neighbouring cell.

A drawback with this prior art solution is that unnecessary radio interface load is generated in the network because each UE simultaneously needs to transmit and report handover measurements and scheduling requests each time such UE has some data to send. Furthermore the handover triggering and reporting criteria differs from the criteria for ICIC as described above. In addition, the radio environment can change during scheduling grants especially with persistent and semi-persistent scheduling. Persistent scheduling is a scheduling of resource blocks (granted to a UE (or a group of UEs)) that is valid for a relatively long time period ahead, and semi-persistent scheduling is a scheduling of resource blocks (granted to a UE (or a group of UEs) that is valid for as long as more data is sent within a predetermined time period of last sent data and expires if no data is sent within the predetermined time period. Thus in the case of persistent and semi-persistent scheduling, no scheduling request(s) are sent from the UE and hence no handover report.

In the international patent application No. PCT/SE2007/050257 there is disclosed a method in a base station for predicting interference contribution, when scheduling an uplink data transmission from a first UE being connected to the base station. In this scenario, the UE is located in the neighbourhood of a neighbouring cell served by a neighbouring base station. Thus, the UE is close to the cell boarder. The method suggested in this prior art comprises the steps of: obtaining signal strength measurements from the UE (the signal strength measurements are based on a reference signal received by the UE from the neighbouring base station); receiving a resource scheduling request from the UE for the uplink data transmission, scheduling uplink resources for the requested uplink data packet transmission; determining transmission power to be used for the scheduled uplink resources; and estimating an interference prediction contribution based on the determined transmission power and the obtained signal strength. This prior art does however not describe what criteria are used for the reporting.

SUMMARY

It is thus an object of the embodiments of the present invention to address the above mentioned problems and to provide a method for use in a user equipment and a user equipment for enabling a serving base station to estimate interference contribution in a network when scheduling packet transmission for the user equipment.

According to an aspect of embodiments of the present invention, the above stated problem is solved by means of a method comprising the steps of: determining an amount of uplink resources that a user equipment requires for sending uplink data; and when it is determined that the amount of required resources is greater than a predetermined threshold value, transmitting a report in a previously scheduled uplink resource. The report to transmit includes measurements performed by the user equipment based on signals received from a serving base station and from at least one neighbouring base station.

According to another aspect of embodiment of the present invention, the above stated problem is solved by means of a user equipment in a network comprising a serving base station serving and one or several neighbouring base stations. The user equipment comprises: means for determining an amount of resources required to send uplink data; receiving means for receiving signals from the serving base station and from the neighbouring base stations; means for performing measurements on the received signals, and transmitting means for transmitting, when it is determined that the amount of resources required is greater than a predetermined threshold value, a report in at least one previously scheduled uplink resource. The report comprises the measurements performed by the user equipment.

An advantage with the present invention is to avoid unnecessary reporting by the user equipment since the reporting of the measurements by the user equipment is performed when it is determined that there is a significant amount of uplink data to send that will utilize a significant amount of resources.

Another advantage with the present invention is that unnecessary reporting leads to less radio interface load in the network and less power consumption in the user equipment.

Yet another advantage with the present invention is that no separate scheduling request is issued for the report only since the report is sent in a previously granted resource.

Still other objects and advantages of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a communications network based on the third generation (3G) long term evolution (LTE) concept. It should be noted that the present invention is not restricted to 3G LTE but can be applicable in other wireless systems such as WiMAX (worldwide interoperability for microwave access), or HSPA (high speed packet access) or WCDMA (wideband code division multiple access).

Figure 1:
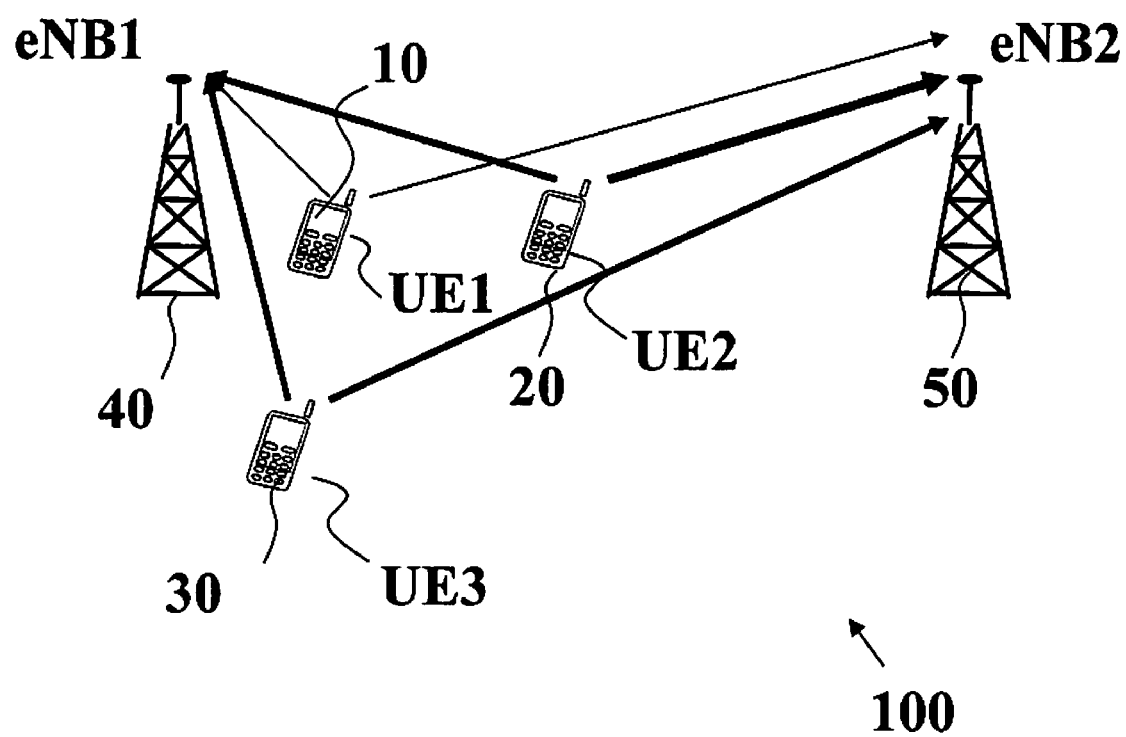
FIG. 1 is a diagram illustrating an example of uplink interference in a mobile communication network system.

FIG. 1 is a simple diagram illustrating a mobile communication network system 100 comprising user equipments of which only three are shown and are denoted UE1 10, UE2 20 and UE3 30. The network 100 further comprises two radio base stations 40 and 50. A radio base station is also known as a NodeB or eNodeB (eNB) in 3G LTE. In the network 100, UE1 10, UE2 20 and UE3 30 are all assumed to be connected to radio base station eNB1 40, i.e. the user equipments are served by eNB1 whereas eNB2 50 is considered a neighbouring base station to eNB1 40. For uplink inter-cell interference coordination, the radio position of UE1 10, UE2 20 and UE3 30 relative to the second radio base station eNB2 50, is important and essential for predicting the amount of interference caused by UE1 10, UE2 20 and UE3 30 to eNB2 50. The radio position can e.g. represent the path loss to connected and neighbouring base stations. The path loss is also generally known as path attenuation and can be defined as the reduction in power density of a radio wave as it propagates through space/air. Referring back to network 100 of FIG. 1, UE1 10 being served by eNB1 40, causes less interference to eNB2 50 than UE2 20 because UE1 10 is located further away from eNB2 50 than does UE2 20. However, the estimate of the interference contribution may be significantly improved when the path loss from both connected and neighbouring base station(s) is/are also taken into consideration.

In network 100, UE3 30 will cause less interference to eNB2 than does UE2 20. However, UE3 30 will cause more interference than UE1 10 because uplink power control is applied i.e. UE3 30 uses more power to transmit to eNB1 40 than does UE1 10. Thus, only the path loss to neighbouring base station(s) is not sufficient either since power control is applied. As previously described, path loss measurements maybe used by a serving base station to schedule resources to a UE. In e.g. LTE, the uplink scheduling for a transmission of a large amount of data is performed in two phases according to the following steps:

1. The UE sends a scheduling request to send with limited information (e.g. 1 bit).
2. The serving eNB schedules a limited amount of resource blocks in order to not waste resources.
3. The UE sends a more detailed buffer report along with the first uplink data.
4. The eNB can, based on the improved knowledge, schedule a larger amount of resource blocks if desired.

According to exemplary embodiments of the present invention, a UE determines the amount of required resources to send uplink data and transmits a report indicating measurements performed by the UE on signals received from the serving base station and one or more neighbouring base stations, when the UE determines that the amount of resources is greater than a predetermined threshold value for example 50 resource blocks. Note that the threshold value is a design parameter and the present invention is therefore not restricted to any specific value. The report can be transmitted in a previously scheduled uplink resource. The measurements included in the report can e.g. relate to reference signal received power (RSRP) based on e.g. pilot signals received from the neighbouring base stations(s) and from the serving base station. The path loss can e.g. be estimated based on RSRP in combination with reference signal power, i.e. path loss=reference signal power−RSRP. An example of a measure to report by the UE is the RSRP used for handover. Since this measure also includes own cell (serving base station) RSRP, the used power can then be calculated enabling good estimation of caused interference in combination with neighbouring cell RSRP.

According to an embodiment of the present invention, the path loss difference between own base station (or own cell) and neighbouring base station (or neighbouring cell) is a suitable measure without making use of the transmitted power. For each neighbouring base station RSRP, the corresponding neighbouring cell identity is also included in the report.

The report transmitted by the UE to its serving base station (serving eNB) can be used by the serving eNB to assist with its estimation of the degree of inter-cell interference each UE will generate and hence the power and resource(s) to assign. The eNB thus can use the report in order to support efficient inter-cell interference coordination (ICIC) in the network, when scheduling data packet transmission for the UE. According to an embodiment of the present invention, the report may further comprise a buffer status determined by the UE.

The time when the report including the measurements shall be available in the serving eNB is when scheduling a larger amount of resources which can cause significant interference. As an example, in LTE, the time when the report shall be available in eNB is at step 4 described above.

According to an exemplary embodiment of the present invention, a triggering criterion for the report can be at the same time as a buffer status is reported to eNB. In the above LTE example, the triggering could be at step 3 and in the case when the amount of resources required to send data is greater than a predetermined threshold value. Thus, a scheduling procedure in LTE is further improved using a UE reporting in accordance with embodiments of the present invention. The UE report can e.g. be sent via an uplink channel (e.g. a shared channel SCH) in a header of the medium access control channel (MAC) or in a radio resource control message (RRC) when the UE is already granted resource(s), thus no specific scheduling request needs to be is issued for this report only.

According to another exemplary embodiment of the present invention, a triggering criterion for the report can be when there is at least data in uplink buffer of the UE that can fill a defined number of resources with a current scheduled format and where a previous report to the serving eNB was e.g. sent more than a defined time ago. The defined time is a design parameter than can e.g. be set by the operator of the network.

According to another exemplary embodiment of the present invention, a triggering criterion for the report can be when there is at least data uplink in the buffer that can fill a defined number of resources and any one of the measurements, such as a RSRP value, has changed more than a predefined threshold compared to the latest measure sent in a previous report. Also here, the predefined threshold is a design parameter.

According to yet another exemplary embodiment of the present invention, a triggering criterion for the report can be when there is at least data uplink in the buffer that can fill a defined number of resources and when it is further determined that a previous report is outdated i.e. the previous report was sent more that a defined time ago.

According to a further exemplary embodiment of the present invention, a triggering criterion for the report can be when there is at least data uplink in the buffer that can fill a defined number of resources and when it is determined that a measure corresponding to a path loss difference between the serving cell (or serving base station) and the neighbouring cell (or neighbouring base station) has changed more than a predefined threshold value compared to a previous path loss difference in a previously sent report.

According to an exemplary embodiment of the present invention, only neighbour cell measurements for cells with a RSRP value (X dB, where X is a design parameter) within defined threshold below serving cell can be used to triggering the report and also be included in the report. Typical values of X can be in the order of 6-20 dB. It should be noted that neighbour cell measurements weaker than that can be considered less interfered and has thus less significance for ICIC. Note that X can take any value since it is a design parameter.

As mentioned earlier, in order to support efficient ICIC in the network, UE measurement and reporting is needed in the base station serving the UE. The serving base station uses the report to estimate a degree of inter-cell interference each UE will generate in the network and hence the power and resource(s) to assign/schedule. The UE reporting can therefore be seen as scheduling information needed by the serving base station. This scheduling information can thus include, as previously described, own cell (or own base station) RSRP value and neighbour cell measurements comprising RSRP value and cell identity for each neighbouring cell. The uplink buffer status may also be included in the scheduling information. Note that, the UE report (or scheduling information) is not transmitted to the own base station if there is less data in the uplink buffer than what is needed to fill a number of resources with a previously scheduled format.

Figure 2:
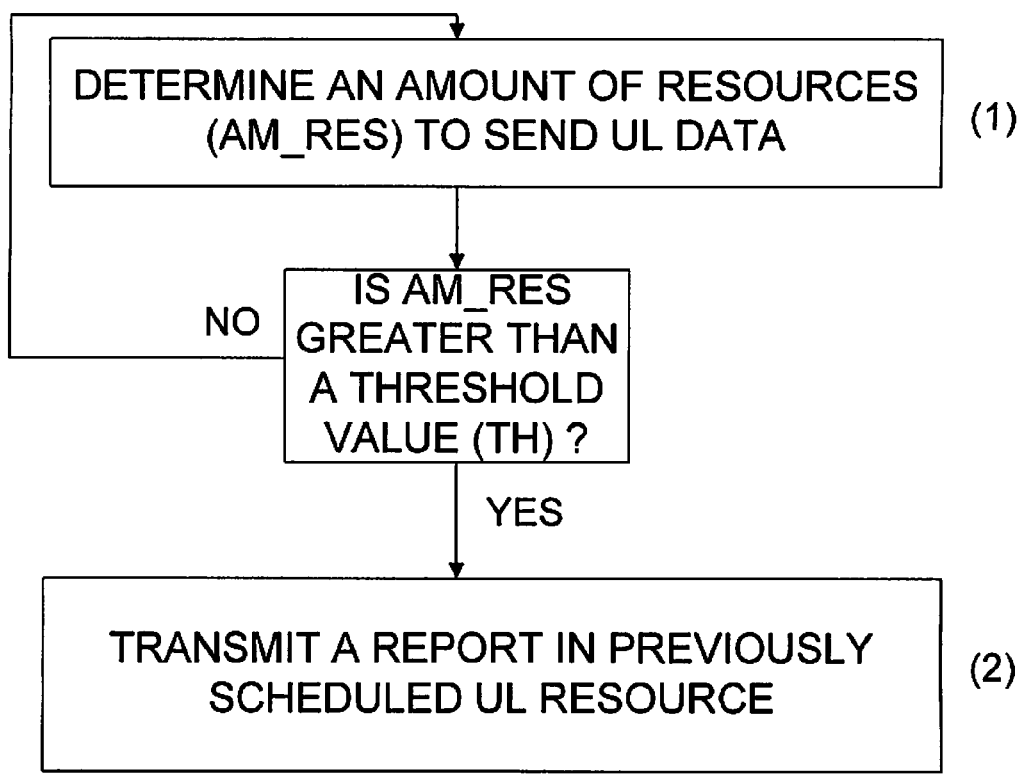
FIG. 2 illustrates a flowchart of a method according to exemplary embodiments of the present invention.

Referring to FIG. 2, there is illustrated a flowchart of a method describing the main steps performed by a UE, according to previously described embodiments of the present invention. As shown in FIG. 2, the main steps of the method comprise:

(1) determining an amount of resources (Am_Res) required to send uplink (UL) data.

(2) transmitting, when it is determined that the amount of resources (Am_Res) is greater than a predetermined threshold value (TH), a report in at least one previously scheduled UL resource. The report comprising measurements performed by the UE based on received signals from the serving base station and from one or several neighbouring base station. Note that the report is not transmitted if the amount of resources is not greater than the predefined threshold value.

As indicated earlier, the report may further include an uplink buffer status. The uplink buffer status is therefore not necessarily reported at the same time as the amount of required resources is reported. Note that the uplink buffer status is not necessarily the same type of measurement and unit either. As an example, the buffer status can be measured in units of bits whereas the amount of resources can be measured as number of resource blocks or number of TTI;s (transmission time interval) or a predicted transmission time or transmission power/energy or any other type of resources the UE requires for transmission of the UL data in the buffer. It should also be noted that an amount of required resources better represents the predicted interference than does the amount of transferred data bits.

Figure 3:
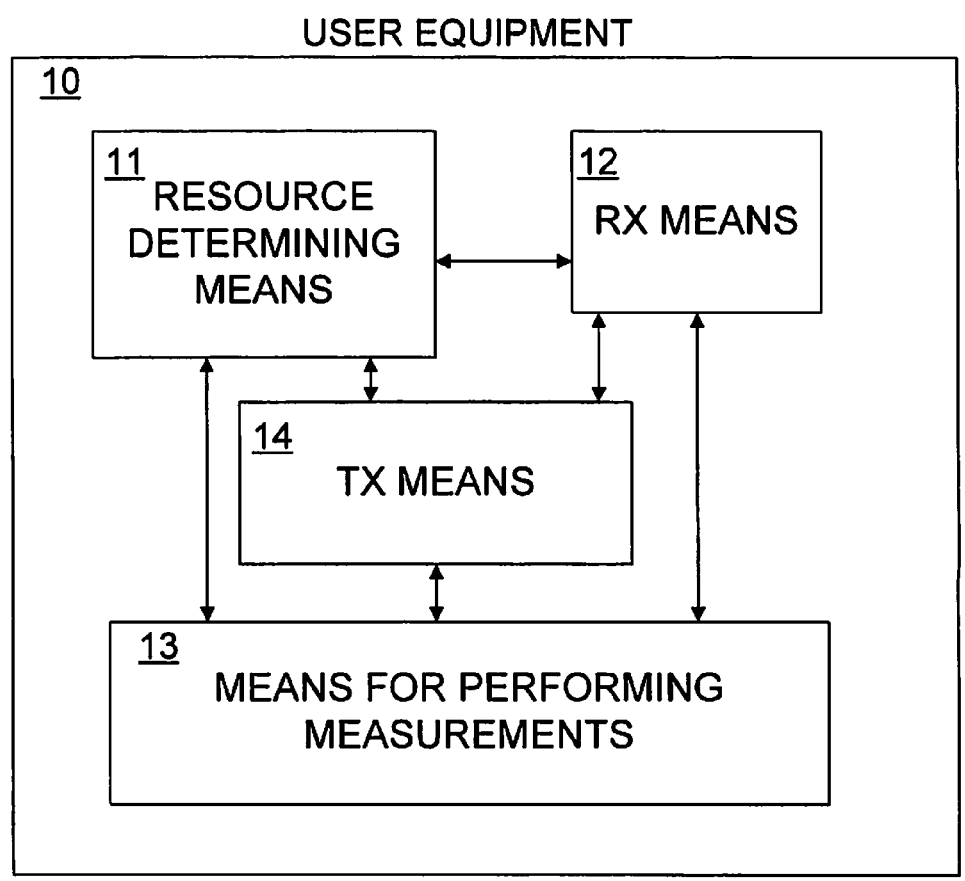
FIG. 3 illustrates an exemplary block diagram of a user equipment according to exemplary embodiments of the present invention

Referring to FIG. 3 there is illustrated a simplified block diagram of a user equipment UE 10, in accordance with exemplary embodiments of the present invention. As shown, UE 10 comprises means 11 for determining an amount of resources required to send uplink data; receiving means 12 (RX MEANS) configured to receive signals from the serving base station and from said one or several neighbouring base stations; means 13 for performing measurements based on the received signals; and transmitting means 14 (TX MEANS) configured to transmit to the serving base station, a report in one or more previously scheduled uplink resource(s), when it is determined by the determining means 11 that the amount of required resources is greater than a predetermined threshold value. The report, as previously described, comprises the measurements performed by the UE 10. It should be noted that the different means described above and illustrated in FIG. 3 are not necessarily separate from each other. Note also that the UE 10 may comprise other means or elements not illustrated in FIG. 3.

An advantage with the present invention is that the reporting frequency is limited because the UE sends a report after it determines that there is a significant amount of uplink data to transmit that will utilize a significant amount of resources. This will lead to less radio interface load in the network and less power consumption in the UE.

The present invention and its embodiments can be realised in many ways. For example, one embodiment of the present invention includes a computer-readable medium having instructions stored thereon that are executable by a user equipment of a telecommunications system. The instructions executable by the user equipment and stored on a computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for use in a User Equipment (UE) for enabling a base station serving the UE to estimate the UE's interference contribution in a network when scheduling data packet transmission for the UE, the method comprising the steps of:
   the UE performing measurements of signals received from the serving base station and from at least one neighboring base station;
   the UE determining an uplink buffer status and an amount of resources required to send uplink data;
   the UE determining whether the amount of required resources is greater than a predetermined threshold value; and
   in response to determining that the amount of required resources is greater than the predetermined threshold value, the UE transmitting a report to the serving base station, wherein the report includes the uplink buffer status and the measurements performed by the UE of the signals received from the serving base station and from the at least one neighboring base station, and the UE transmits the report in at least one previously scheduled uplink resource to assist the serving base station in estimating the UE's interference contribution in the network if the required resources are assigned to the UE.

2. The method according to claim 1, wherein in the measurement performing step, said measurements comprise a measure of a received power level of a reference signal from the serving base station, and a measure of a received power level of a reference signal from said at least one neighboring base station.

3. The method according to claim 2, wherein said reference signals correspond to pilot signals received from the serving base station and from said at least one neighboring base station.

4. The method according to claim 2, wherein in the transmitting step, said report further comprises, for each reference signal from a neighboring base station, a neighboring cell identity.

5. The method according to claim 1, wherein the transmitting step further comprises the UE transmitting said uplink buffer status to the serving base station.

6. The method according to claim 1, wherein the step of transmitting further comprises the UE transmitting said report when the UE further determines that a previous report was sent more than a defined time ago.

7. The method according to claim 1, wherein the step of transmitting further comprises the UE transmitting said report when the UE further determines that any one of said measurements has changed more than a predefined threshold value compared to measurements in a previously sent report.

8. The method according to claim 1, wherein the step of transmitting further comprises the UE transmitting said report when the UE further determines that a measure corresponding to a path loss difference between the serving base station and the neighboring base station has changed more than a predefined threshold value compared to a previous path loss difference in a previously sent report.

9. The method according to claim 1, further comprising, prior to the step of the UE determining the amount of resources, the UE transmitting a resource scheduling request for an uplink data packet transmission to said serving base station and receiving a message from said serving base station indicating scheduled uplink resources for the requested uplink data transmission.

10. A User Equipment (UE) in a network comprising a base station serving the UE and at least one neighboring base station, the UE comprising:
    a resource determination unit configured to determine an uplink buffer status and an amount of resources required to send uplink data and to also determine whether the amount of required resources is greater than a predetermined threshold value;
    a receiver configured to receive signals from the serving base station and from said at least one neighboring base station;
    a measurement unit to perform measurements of the received signals; and
    a transmitter configured to transmit a report to the serving base station when the resource determination unit determines that the amount of required resource is greater than the predetermined threshold value, wherein the report includes the uplink buffer status and the measurements performed by the UE of the signals received from the serving base station and from the at least one neighboring base station, and wherein the transmitter transmits the report in at least one previously scheduled uplink resource to assist the serving base station in estimating the UE's interference contribution in the network if the required resources are assigned to the UE.

11. The UE according to claim 10, wherein said measurements comprise a measure of a received power level of a reference signal from the serving base station and a measure of a received power level of a reference signal from said at least one neighboring base station.

12. The UE according to claim 11, wherein said reference signals correspond to pilot signals received from the serving base station and from said at least one neighboring base station.

13. The UE according to claim 11, wherein said report further comprises, for each reference signal from a neighboring base station, a neighboring cell identity.

14. The UE according to claim 10, wherein said UE is configured to determine an uplink buffer status and the transmitter is configured to transmit said uplink buffer status to the serving base station.

15. The UE according to claim 10, wherein the transmitter is configured to transmit said report when said UE further determines that a previous report was sent more than a defined time ago.

16. The UE according to claim 10, wherein the transmitter is configured to transmit said report when said UE further determines that any one of said measurements has changed more than a predefined threshold value compared to measurements in a previously sent report.

17. The UE according to claim 10, wherein the transmitter is configured to transmit said report when the UE further determines that a measure corresponding to a path loss difference between the serving base station and the neighboring base station has changed more than a predefined threshold value compared to a previous path loss difference in a previously sent report.

* * * * *